Aug. 1, 1961 J. M. WALTER ET AL 2,994,250
POWER DRAW BAR MECHANISM
Original Filed July 28, 1955 4 Sheets-Sheet 4

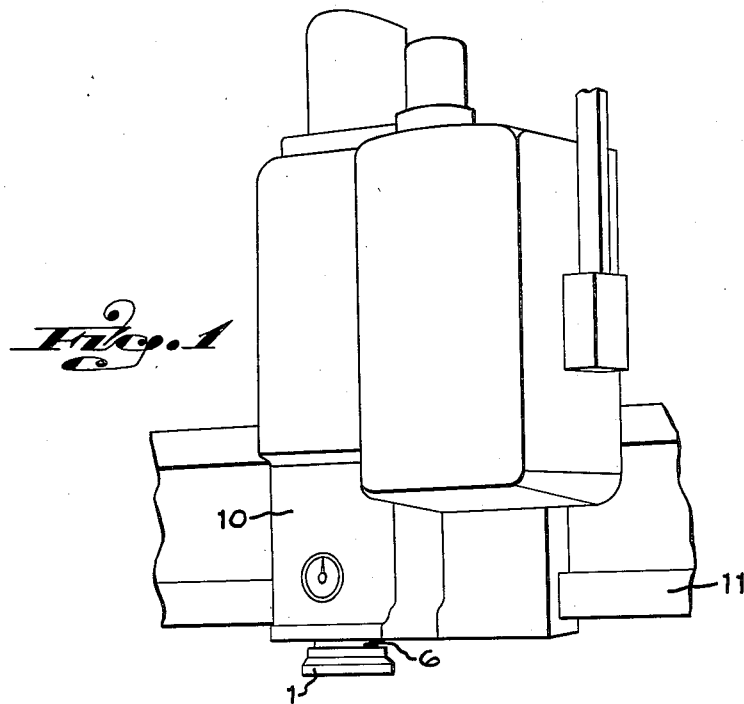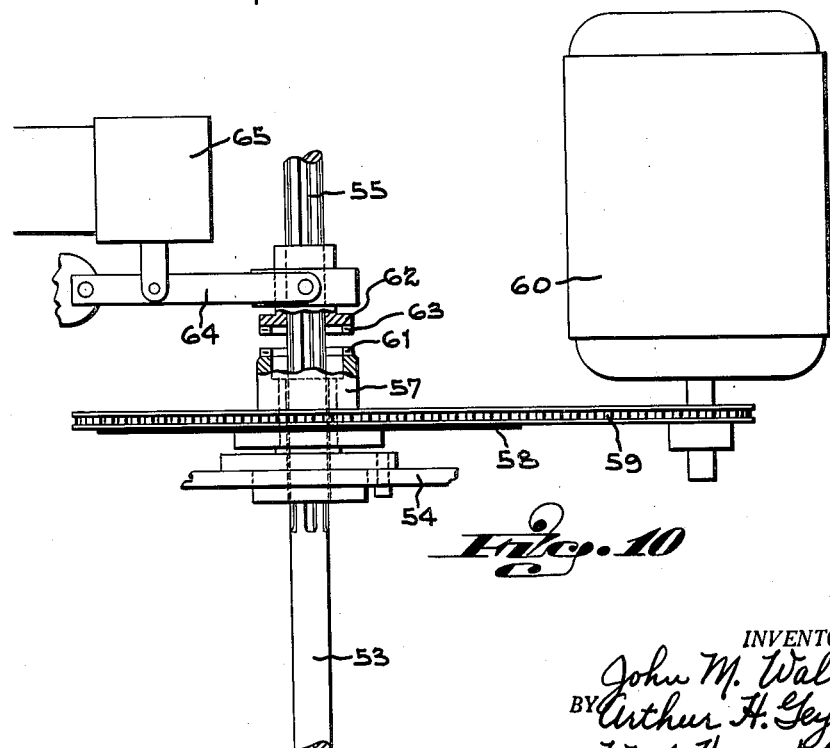

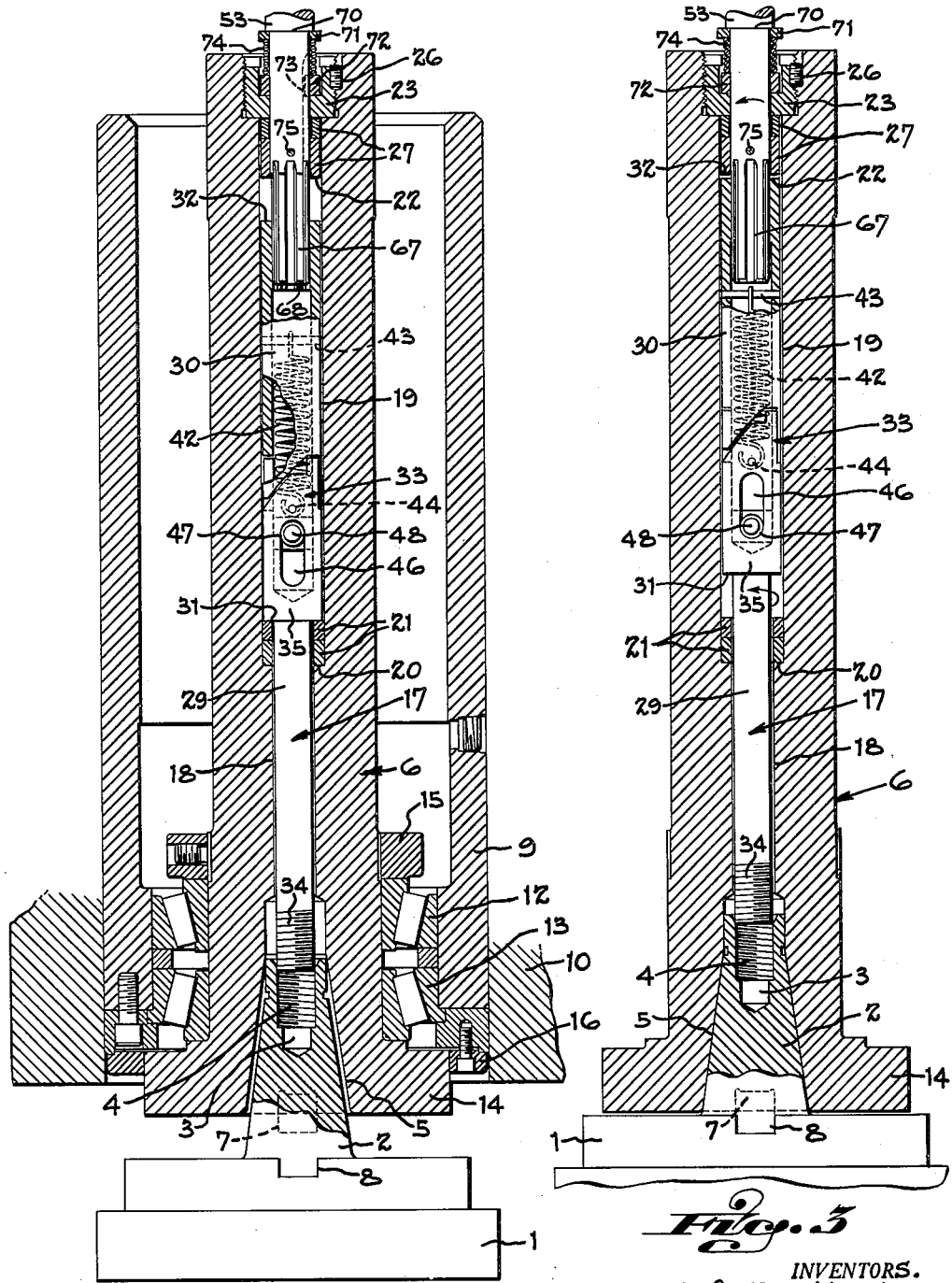

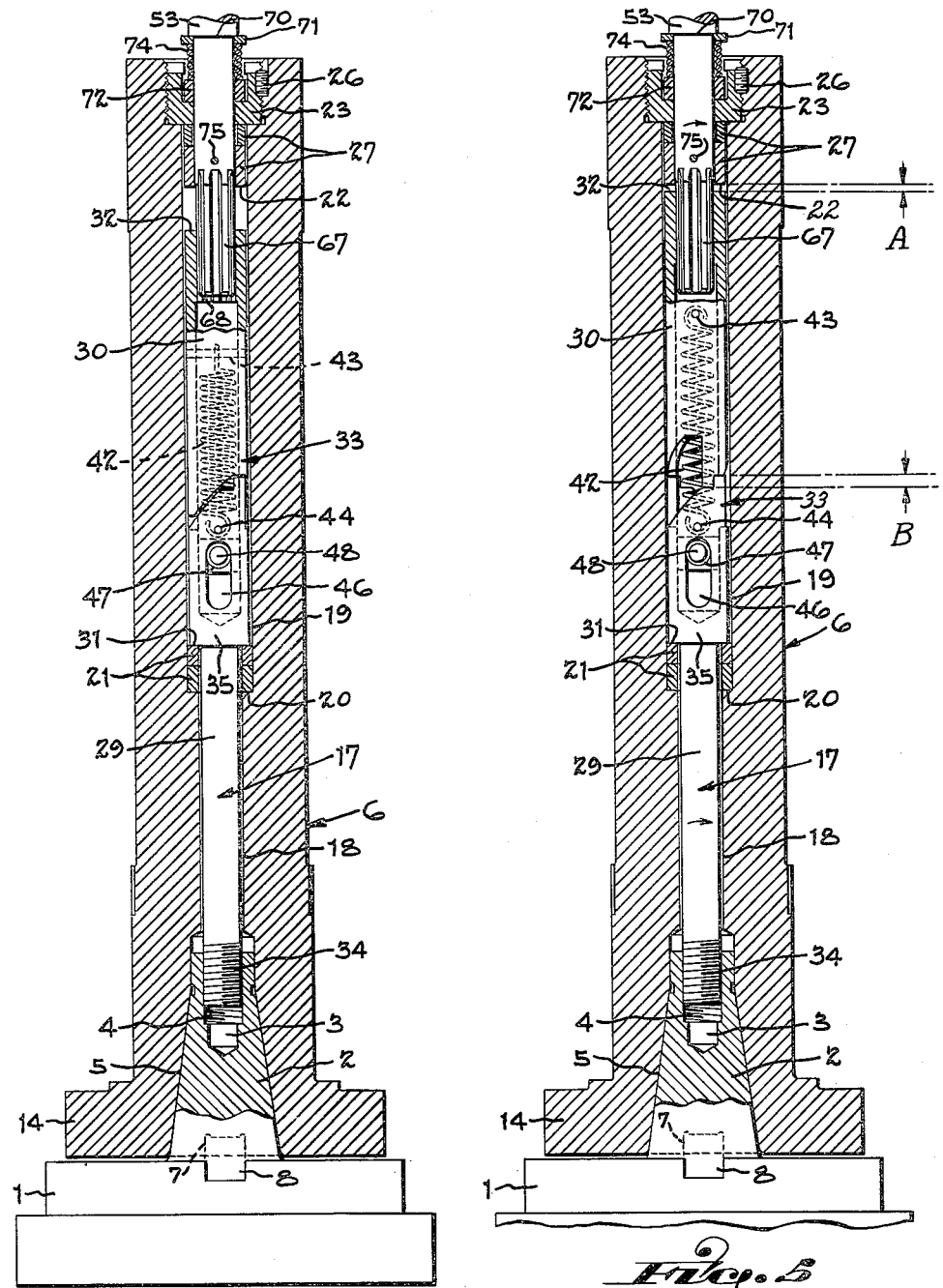

INVENTORS.
John M. Walter.
BY Arthur H. Geyler.
Wood, Herron & Evans.
ATTORNEYS.

United States Patent Office 2,994,250
Patented Aug. 1, 1961

2,994,250
POWER DRAW BAR MECHANISM
John M. Walter and Arthur H. Geyler, Cincinnati, Ohio, assignors to The G. A. Gray Company, Cincinnati, Ohio, a corporation of Ohio
Continuation of application Ser. No. 524,967, July 28, 1955. This application Apr. 27, 1959, Ser. No. 809,310
9 Claims. (Cl. 90—11)

This invention relates to a draw bar mechanism for securing a cutter to the rotatable spindle of a machine tool and for subsequently demounting the tool from the spindle to be interchanged with other types of cutters. The present application is a continuation of the co-pending application of John M. Walter and Arthur H. Geyler, Serial No. 524,967, filed on July 28, 1955, now abondoned.

Milling cutters of the type to which the present invention is directed, such as those used in large horizontal planer-type milling machines, are equipped with tapered shanks adapted to be interfitted with a correspondingly tapered socket formed in the working end of the tool spindle. There is a substantial variation in the degree of taper which tool designers and machine tool builders have developed to suit the needs of particular machining operations. However, two standard tapers are now widely used in the industry, making it possible to supply spindle sockets which will receive one or the other of the two standard cutting tool shanks. One of these standards provides a taper of approximately three and one-half inches per foot (National Standard) and is known as a "non-sticking" taper. This taper angle is quite steep and a draw bar necessarily is used to exert a constant pull on the tool shank to hold it in place in the spindle socket. As soon as the draw bar is released, the tool will drop out of the socket or can easily be removed since the degree of taper was selected to provide this non-sticking quality.

On the other hand, where a greater degree of strength and rigidity is required, the spindle socket and tool shank is provided with a lesser taper, known as a "sticking" taper. One standard taper of this type (Brown and Sharpe) has a taper angle of approximately five-eighths of an inch per foot, as compared with the National Standard of three and one-half inches per foot. Tools having a low taper of this order, upon being forced into a correspondingly tapered spindle socket, become wedged or locked and cannot be dislodged from it without the application of a driving force. Moreover, in the use of such tools, the reaction of the cutting edges upon the work tends to drive the tapered shank more firmly into the socket, thus making the mounting of the tool in the spindle even more secure and rigid. This action however also has the effect of making the tool all the more difficult to remove. Briefly therefore, in order to dislodge the tool having a sticking taper, a power blow is required whereas the tool having a non-sticking taper can be dislodged merely by releasing the draw bar, allowing the tool to fall out of its own weight.

The conventional draw bar, with which the spindles of most milling machines, boring machines and the like are equipped, is in the form of an elongated tie bolt extending axially through the spindle. For engaging the tapered shank of the cutter, one end of the draw bar is threaded and extends partially into the tapered socket of the spindle, while the opposite end has a head which bears against the opposite end of the spindle. The end portion of the tapered tool shank includes a threaded bore to receive the threaded end of the draw bar, such that the draw bar, upon being tightened, pulls the tapered shank into the socket and thus frictionally secures the tool in cutting position to the working end of the spindle. For removal of the tool, the draw bar is unthreaded; if the tool shank and spindle bore have a non-sticking taper, then the tool shank will be released when the draw bar is loosened. However, if the shank and socket have a sticking taper, then it is necessary to forcibly dislodge the shank by hammering the head of the draw bar, thereby to drive the shank from the socket.

This conventional draw bar arrangement is practical in machines of small size but is impractical and dangerous when machines are large and the cutters are heavy, as is the case with planer-type milling machines and the like. In such instances, especially where the spindle is mounted upon a vertical axis, two workmen may be required to make the tool change, one to hold the cutting tool in place at the spindle, the other to climb to the top of the spindle and rotate the draw bar for screwing or unscrewing its threaded end with respect to the tool shank, and also to hammer upon the head of the draw bar if necessary for dislodgment of the tool. More recently, machines having power driven draw bars have been provided, but an element of danger still persists in their usage because the depth of the threaded bore of the tool shank is limited; hence, during dislodgment of a sticking shank, the entire weight of the tool may be carried by only a few threads of the draw bar. Should such threads have been mutilated during prior usage, as is frequently the case, then there is the likelihood that the tool will inadvertently drop from the spindle when the draw bar is partially unscrewed.

One of the primary objectives of the present invention has been to provide a power-operated draw bar mechanism for tool spindles, which is usable with tapers either of the sticking or non-sticking type, wherein the mechanism applies an unscrewing rotation to the draw bar for releasing a non-sticking shank, combined with an axial force for dislodging a tool shank of the sticking type.

A further objective has been to provide a simplified draw bar mechanism for use in conjunction with heavy cutting tools wherein tool dislodgment may be effected while a substantial length of threaded engagement is maintained between the draw bar and tool shank to prevent accidental dropping of the tool, and wherein tool mounting and demounting may be accomplished in a rapid, convenient and virtually automatic manner.

Another objective has been to provide a draw bar mechanism having a simple cam and abutment arrangement for rendering the draw bar effective to cause forcible tool dislodgment upon rotation of the draw bar in unscrewing direction before the draw bar is unscrewed from the tool shank to any substantial degree.

Described briefly, a preferred structure according to the principles of the invention, essentially comprises two coaxial draw bar sections, one section comprising a driver interconnected with a reversible power motor, while the other comprises a tool-engaging section having a threaded rod or draw bar which screws endwisely into the bore of the tool shank. The two sections reside loosely within an axial bore in the tool spindle and comprise pull-in and push-out abutment surfaces respectively cooperable with pull-in and push-out shoulders or abutments of the spindle. The contiguous ends of the two draw bar sections are in the form of mating cam faces, generally of helical or lift profile, and the said cams are configurated relative to one another to provide positive driving connection of the tool-engaging section by the driver section in either direction of rotation of the latter. The contiguous ends of the two draw bar sections also are configurated so that axial thrust may be imparted from the driver section to the tool-engaging section. The two sections normally are spring biased toward one another and reside in contracted relationship within the spindle. Thus, the sections are normally collapsed, in that the over-all distance between the abutments of the draw bar is least, when the driver section is rotated in the screw-in direction, and when the driver is rotated in the screw-out direction the cam surfaces thrust the sections apart so that the distance between the abutments thereof approximates the distance between the opposed abutments on the spindle and then drives the tool-engaging section in screw-out direction relative to the tool shank.

When the motor is energized in the screw-in direction, the draw bar sections remain in their contracted relationship and the draw bar threads itself into the tool shank and, with the pull-in abutments of the tool-engaging section in engagement with pull-in abutments of the spindle, then pulls the shank forcibly into the tapered socket.

When the driver section is rotated in the screw-out direction, the cam faces axially thrust the driver section from the driven section and also establish a driving connection with the tool-engaging section, so as to initially break loose its threaded engagement with the tool shank. Both sections in unison now begin to move away from the tool as unscrewing proceeds, in consequence of which the push-out abutment of the driver section comes into engagement with the push-out stop on the spindle. This limitation of movement is translated through the axial or longitudinal inter-engagement of the sections with one another as a thrust upon the tool to disengage it from the socket. Preferably, the stops on the spindle are spaced apart a distance only slightly greater than the distance between the abutments on the draw bar sections when the sections are moved apart by cam action, so that the push-out stop of the driver reaches the push-out stop of the spindle before the tool-engaging section is appreciably unscrewed from the tool shank. If the taper is of the non-sticking type, the thrust force is unnecessary and the mechanism simply unscrews the draw bar while the shank slides outwardly from its socket during continued rotation of the shaft sections. On the other hand, if the taper is of the sticking type, the unscrewing torque will screw the draw bar outwardly from the sticking shank, and the axial force will dislodge the sticking shank for subsequent removal during continued rotation of the draw bar. If the first application of force fails to dislodge the stuck shank, then the operation is repeated.

Various other features and advantages of the invention are brought out in greater detail in the following detailed description taken in conjunction with the drawings illustrating a preferred embodiment of the invention.

In the drawings:

FIGURE 1 illustrates the spindle head of the typical type of machine tool in which the invention is adapted to be employed.

FIGURE 2 is a cross sectional elevation of the quill and spindle of the machine showing the relationship of the draw bar parts upon presentation of a tool to the spindle for mounting of the same.

FIGURE 3 is a view similar to FIGURE 2 showing the draw bar mechanism under power operation at the start of engagement of the draw bar with the tool.

FIGURE 4 is a view similar to FIGURE 2 showing the parts in the positions they occupy during use of the tool upon the spindle.

FIGURE 5 is a view similar to FIGURE 2 showing the draw bar under power operation at the start of tool dislodgment.

FIGURE 10 is a diagrammatic view showing power drive apparatus for the draw bar.

Figure 6:
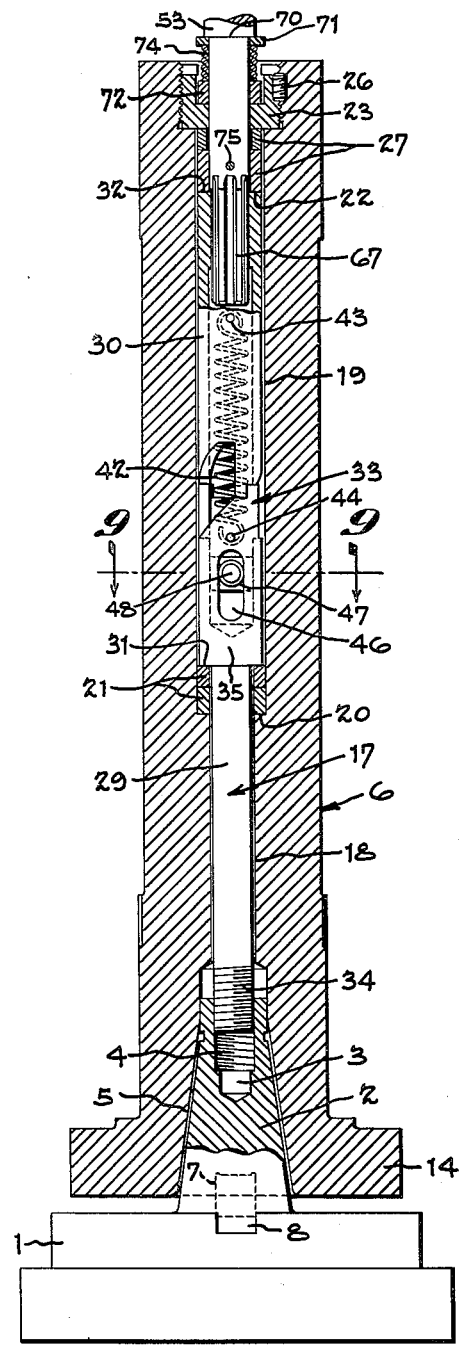
FIGURE 6 is a view similar to FIGURE 2 showing the tool dislodged from the spindle but not yet disengaged from the tool.

Rotary cutters of the type commonly used in large milling machines and the like may weigh anywhere from 10 to 200 pounds or more, and for attachment to a tool spindle they are provided with various standardized types of shanks or mountings, each type having a threaded bore or limited depth adapted to receive a draw bar. A typical tool construction is illustrated wherein the cutter 1 (FIGURE 2) is provided with a tapered shank 2 having a central bore 3 which is threaded internally as at 4. The tapered shank 2 interfits within a tapered recess 5 of the rotatable spindle 6 of the machine tool. In some instances, the spindle additionally is equipped with one or more driving keys 7 which engage keyways 8 in the cutter.

The taper of the tool shank and spindle bore shown in the drawings represents either a sticking taper or a non-sticking taper for purposes of illustration. It will be understood that the draw bar mechanism is mounted interchangeably in tool spindles of either type without any change in structure or principle of operation.

The spindle 6 may be rotatably journalled for axial movement in a quill 9 mounted in the head 10 of the machine. Depending upon the type of machine, the head 10 (FIGURE 1) may be slidable upon a rail 11 which, in turn, may be vertically movable upon one or more columns, not shown. By relative horizontal and vertical adjustments of the rail 11, head 10, and quill 9, the cutter 1 may be brought to a predetermined position with respect to a work piece. In other types of machines the spindle may be immovable axially and/or rotatable about a horizontal axis, but in any event, the spindle will be equipped with some sort of tie bolt to hold the cutter to the spindle during machine operation; hence, it will be understood that the particular machine shown is only illustrative of the environment to which this improvement is addressed.

In the construction shown, the quill 9 is a tubular sleeve having opposed, tapered roller anti-friction bearings 12 and 13 mounted therein, and the spindle 6 is received in the inner races of the bearings, flanges 14 of the spindle being shouldered against the outermost of the bearings while an adjustable collar 15 resides in abutment with the innermost of the bearings to hold the spindle against axial movement. The journal is provided with the usual dust cover 16 or the like, and a similar journal arrangement, not shown, is employed at the other end of the spindle.

The power draw bar apparatus of the present invention, indicated generally at 17, is housed in a central, longitudinal bore 18 of the spindle which is also counter bored to provide an enlarged diameter portion 19. A shoulder 20 is provided at the juncture of the two bores which, in the embodiment shown, constitutes a pull-in seat for the tool-engaging shaft section. For wear purposes, a pair of bronze washers 21—21 are rested on this shoulder and for convenience the upper surface of the top washer may be termed the fixed screw-in abutment.

Spindle 6 is provided with an opposed shoulder which may be termed a push-out or tool dislodgment abutment 22 spaced from the screw-in abutment 20 (FIGURE 2), and which, in the construction shown, is furnished by a plug 23 which is threaded into a counter bore at the upper end of the spindle wherein the plug is keyed against rotation by a screw 26. The abutment face 22 is constituted as the outer face of the lower of a pair of washers 27—27 which, like the washers 21—21 are installed for wear purposes.

The draw bar assembly 17 is an elongated unit made up of articulated sleeve sections 29 and 30. The lower of these sections carries a pull-in shoulder 31 which is cooperable with the pull-in abutment 20 of the spindle (FIGURE 3), while the upper one comprises a push-out abutment surface 32 which cooperates with the fixed push-out abutment 22 of the spindle. A spreader cam means or coupling indicated generally at 33, which is explained in detail at a later point in the specification, is provided through which distance across the abutments 31—32 or their linear spacing, may be shifted or altered automatically relative to the spacing or linear distance between the fixed abutments 20 and 22. This is accomplished as an incident to draw bar operation.

The tool-engaging section 29 of the draw bar assembly comprises a slender rod which is threaded as at 34 for direct connection with the internally threaded socket 4 of the cutting tool 1, i.e., the present invention eliminates the need for a separate coupling between the tool and draw bar as is required in some of the past constructions. At its opposite end member 29 carries a head or sleeve section 35 of enlarged diameter which resides in the enlarged diameter portion 19 of the through bore of the spindle. Thus, abutment shoulder 31 is furnished by the juncture of the two diameters. The slender rod portion of this section of the assembly passes through the washers 21—21. The upper portion 30 of the assembly is tubular in form, the upper end terminating as abutment surface 32 which is engageable with the fixed stop 22 of the spindle.

Figure 7:
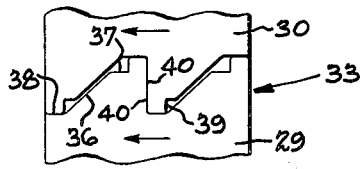
FIGURES 7 and 8 are developed views of one type of means for automatically changing the relative linear spacing of the fixed and movable shoulders of the draw bar mechanism.
Figure 8:
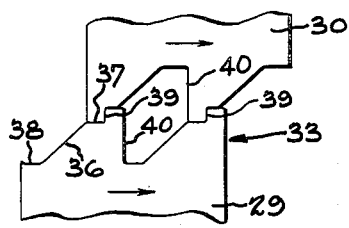

The contiguous ends of the upper and lower sections of the assembly 17 provides the cam means 33. As shown in FIGURES 7 and 8, the terminal portion of each of the sections 29 and 30 comprises axially inclined lift or throw surfaces 36, spaced upper and lower dwell faces 37 and 38, screw-out or driving dogs 39, and screw-in driver faces 40. The cam ends of the respective members are oppositely arranged and complement one another, it being understood that there may be as many lobes spaced apart peripherally as may be desirable; two have been found to be adequate to provide spreading movement of the shoulders 31 and 32 sufficient to accommodate the depths of threaded socket holes furnished in the usual standardized cutting tools. Also, by using the complemental cam configuration, the extensibility is doubled. The dwell surfaces, when in engagement, carry the axial load which the draw bar must sustain during tool dislodgment. These members, of course, are well-finished and hardened to carry the loads which they must sustain.

A tension spring 42, housed within bores of the driver and tool-engaging members, is employed to bias the mating cam surfaces toward one another. For this purpose, one end of the spring is carried on a pin 43 which extends across the bore of the driver upper section 30, while the opposite end of the spring is sustained upon a pin 44 which extends across the bore in the head of the tool-engaging section 29.

Figure 9:
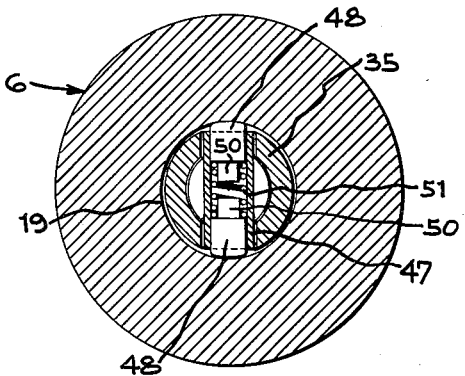
FIGURE 9 is a cross-sectional view taken on the line 9—9 of FIGURE 6.

The head 35 of the tool-engaging member 29 also carries a drag device which brakes its freedom of rotation in the bore of the spindle 6. As shown in FIGURE 9, the head 35 is longitudinally cross slotted, as at 46, to receive a tube 47 which is slightly less in length than the diameter of the head. Opposed shoes 48—48 of friction fiber or similar material are slidably mounted within the tube 47, and the inner ends of the shoes are counter-turned as at 50. A compression spring 51, mounted within the tube 47 around the counter-turned portions 50 of the shoes, urges them outwardly against the internal surface of the spindle bore 19, thereby imposing a frictional load which generally immobilizes the tool-engaging section 29 of the assembly without actually preventing it from rotating under power drive.

Any suitable power driver may be employed to cause rotation of the upper section 30 which constitutes a driver for the lower tool-engaging section 29 of the draw bar assembly. In the construction shown, this is accomplished as follows: A power input shaft 53, suitably journalled as at 54 upon the frame or head of the machine (FIGURE 10), is splined as at 55 over a length corresponding generally to the range of travel of the quill 9 of the machine, and shaft 53 is axially aligned with the spindle 6 and draw bar assembly 17 therein. The splined portion of the shaft carries a collar 57 which is freely rotatable on the shaft 53 and upon which a sprocket 58 is rigidly mounted. Sprocket 58 is driven by a chain 59 from a reversible electric motor 60. The end of the collar 57 is provided with clutch teeth 61 and a cooperating clutch collar 62 having clutch teeth 63 mounted on the splined portion of shaft 53 in slidable driven engagement therewith. Clutch teeth 61 and 63 are cooperable with one another, but the clutch teeth are spaced apart so as to provide lost motion which allows the motor to gain speed before being subjected to the load. Axial movement of collar 62 for clutch engagement and disengagement is provided by a clutch arm 64 which is actuated by a solenoid 65 or in other suitable manner. When the clutch teeth 61 and 63 are disengaged, sprocket 58 rotates freely on shaft 53, but when the clutch teeth are in driving engagement, collar 57 drives collar 62 which, being splined to shaft 53, rotates the latter.

The opposite, endwise portion of shaft 53 is journalled in a central bore in the spindle plug 23, passing through the compression washers 27—27. The endwise portion of the shaft, splined as at 67, is in driving engagement with an internally splined portion 68 provided at the upper end of the driver section 30 of the draw bar assembly. However, shaft 53, at the portion in which it enters the spindle, is of reduced diameter, providing a shoulder 70 against which a washer 71 is abutted. The spindle plug 23 is counter bored to provide a recess for a thrust washer 72 which is keyed to the shaft 53 as at 73, and a compression spring 74 surrounding the shaft 53 is interposed between the two washers 71 and 72 at the other side of the plug 23. The lowermost of the compression washers 27 is fastened to the shaft 53 by means of pin 75. Therefore, shaft 53 is rotatable in the spindle 6 of the machine, but is movable axially in unison with the spindle. Spring 74 biases the draw bar frictionally to the spindle so that the two tend to rotate together. This arrangement helps to overcome the inertia of the draw bar and associated parts which might otherwise tend to cause loosening of the tool if the spindle is accelerated rapidly by its separate drive.

*Operation of apparatus*

When the draw bar assembly 17 is allowed to hang free in the spindle 6, the screw-in shoulder 31 engages the top of the upper thrust washer 21 seated on the fixed abutment 20 of the spindle (FIGURE 2). The drag shoes 48 are urged outwardly against the walls of the spindle bore, but the fall of the assembly to the position shown in FIGURE 2 is permitted because of the cross slot through which the shoes extend.

As shown in FIGURE 2, the shank of a tool 1, introduced into the recess 5 of the spindle, when lifted upwardly comes into engagement with the threaded end 34 of the lower section 29 of the draw bar assembly prior to abutting engagement of the mating tapered surface of the tool shank and spindle recess. Therefore, further lifting of the tool in the spindle recess to the point where the tool shank engages the spindle recess causes the whole draw bar assembly to be lifted vertically in the spindle to the position shown in FIGURE 3. The parts are so dimensioned that in this condition the screw-out abutment shoulder 32 at the upper end of the driver section 30 of the assembly may clear but reside generally adjacent the fixed upper abutment 22. During this period the cam 33 will be collapsed, and the sleeve sections are contracted.

Clutch teeth 61 and 63 are now brought into engagement by action of the clutch arm 64, and motor 60 is then started to drive shaft 53 in the screw-in direction of rotation, as shown by the arrow in FIGURE 3.

Rotation of the shaft 53 in the screw-in direction causes rotation of the driver section 30, and the tool-engaging portion 29 is driven thereby through engagement of the respective screw-in faces 40—40 of the cam means 33 which are now mated with one another as shown in FIGURE 7. Therefore, the threaded portion 34 of the draw bar, having been positioned to engage the threads in the tool shank by resting thereon, now proceeds to thread its way into the tool shank. This motion is accompanied by a downward axial movement of the entire draw bar assembly along the spindle toward the tool until the draw bar abutment shoulder 31 comes into engagement with the fixed abutment face of the thrust washer 21. This arrests axial movement of the draw bar assembly. However, further rotation thereof in the same direction causes the shank of the tool to be threaded and drawn inwardly into tight frictional engagement with the tapered socket of the spindle. FIGURE 4, therefore, shows the tool fully socketed in the spindle and ready for use.

It is contemplated that the motor 60 be of the stall type, such that the driving parts will not be unduly strained, or if desired, a lost-motion friction-type clutch may be employed in place of the positive tooth clutch in the power system. It is also preferable that the motor 60 be controlled by switches of the manually-sustained contact type, such that the motor will run only so long as the appropriate switch button is held in.

By virtue of the operation of the apparatus in such manner that a thrust force is delivered axially upon the cutter while the draw bar is in substantial engagement with the cutter threads, mutilation of the endwise threads of the draw bar or the tool is minimized. On the other hand, the simple, two-part construction of the draw bar, plus the positive functions which it provides, enables the apparatus to be constructed in a rugged and durable manner at low cost.

When it is desired to dislodge the tool from the socket, motor 60 is energized to drive the input shaft 53 in the unthreading direction as indicated by the arrow in FIGURE 5 so as to unscrew the draw bar from the tool shank. It will be observed that at the start of this operation, the shoulder 31 of the tool-engaging section 29 is seated upon the thrust washers 21 through the pulling effect developed previously when the rod 29 was threaded into the tool shank to draw it forcibly into the spindle socket. As the input shaft 53 begins to rotate, the upper section 30 rotates with respect to the lower section 29 which, as noted above, is held stationary through its gripping effect with respect to the tool. As the upper section rotates relative to the lower section, the inclined cam lift surfaces 36 of the two sections thrust the upper section 30 upwardly along the spline 67 of the input shaft while its upper end 36 approaches the screw-out abutment 22 of the spindle bore. At the end of the cam lift motion, the screw-out faces 39 of the cam surfaces engage one another (FIGURE 8) so as to transmit the rotary torque force from the upper section 30 to the lower section 29, thus initially breaking the screw threaded engagement between the draw bar and tool shank.

The position of the two shaft sections at this point is shown in FIGURE 5. It will be observed in this view that with the sections fully extended, a clearance, as indicated at A, exists between the upper end 32 of the upper section and the screw-out abutment surface 22. The clearance A is slightly less than the height of the vertical screw-out faces or dogs 39, as indicated at B in FIGURE 5. Accordingly, upward motion of the upper section is limited to the extent of the clearance A to prevent disengagement of the screw-out faces 39.

As explained earlier, the tapered shank and socket shown in the drawings represents either a sticking or non-sticking taper. If the taper is of the non-sticking type, the mechanism simply unscrews the draw bar during continued rotation of the sections 29 and 30, while the shank slides outwardly with respect to its socket.

FIGURE 6 shows the relationship of the parts with the socket partially dislodged, the tool being slightly separated from the spindle socket and being suspended from the draw bar. It will be noted that the tool shank is engaged with a substantial number of threads at the end of the draw bar, thereby providing complete protection against the tool falling from the spindle. FIGURE 6 therefore represents the condition in which the tool is made ready to be removed physically from the machine. At this time, the operator may be fully prepared to receive the tool when the draw bar is completely released through further rotation of the shaft 53. On the other hand, the tool may be allowed to drop to the platform of a tool transport of the type shown in the co-pending application of John M. Walter et al. Serial No. 514,475, filed on June 10, 1955, now Patent No. 2,925,016, by means of which the tool may be transported conveniently from the machine.

When the tool shank is provided with a sticking taper, the action is generally similar to that described above. However, in this case, the unscrewing torque applied to the draw bar as in FIGURE 5 will screw the draw bar outwardly from the sticking shank, thus taking up the clearance A above the section 30 and causing the screw-out abutments 22 and 32 to engage. At this point, the thrust force acts through the draw bar 29 to dislodge the sticking shank from its socket for subsequent removal during continued rotation of the draw bar. However, in exceptional cases, the sticking may persist and in this case, the dislodging operation may be repeated by energizing the motor 60 in screwing and unscrewing directions so as to progressively unscrew and apply thrust to the draw bar to break the frictional engagement between the shank and socket. It will be observed that the clearance A allows the draw bar to be slightly unscrewed before thrust is applied to the tool, and that dislodging thrust is applied while a substantial number of threads are engaged so as to prevent mutilation of the threads. After the frictional engagement is broken, continued rotation will bring the parts to the relationship shown in FIGURE 6 for subsequent removal of the tool from the spindle.

If desired or necessary, the present mechanism may be utilized to deliver impact blows axially upon the draw rod 29 to dislodge a sticking shank from the spindle socket. In this case, the driving system is arranged to impart rotary motion to the parts in an abrupt manner in forward and reverse directions. Thus, as shown in FIGURE 5, if the input shaft is rotated abruptly in screw-out direction, the abrupt engagement of the screw-out dogs 39 will apply a rotary momentum force to the draw rod in the unscrewing direction to break loose the screw threads and to partially unscrew the rod. Upon abrupt rotation of the parts in the reverse or screw-in direction, the tension spring 42 will propel the upper section 30 sharply in the downward direction by virtue of the sharply inclined throw surfaces 36 of the cams. These surfaces, combined with the rapid rotary motion, will cause the upper section to impart the impact blow to the draw rod section which has been partially unscrewed to permit the impact force ot act upon the sticking shank. During rotary motion in this direction, the drag shoes 48, by virtue of their engagement with the spindle bore, hold the lower section 29 in stationary position against the reaction of the inclined cam surfaces.

In the present disclosure, the shoulders 31 and 32 of the draw bar assembly 17 are relatively movable through operation of the spreader cam 33, while the spacing between the shoulders 20 and 22, provided by the spindle bore is fixed. However, it will be understood that a reverse construction of any suitable form may be employed wherein the shoulders on the draw bar are fixed as to lineal spacing while those on the spindle may be changed as an incident to power operation of the mechanism.

In utilizing the present structure upon a machine tool, an electrical interlock preferably is provided to prevent operation of the draw bar while the spindle is being driven during a machining operation. Also, as disclosed in the aforesaid Walter application, Serial No. 514,475, now Patent No. 2,925,016, an interlock may be provided to prevent power operation of the draw bar motor, particularly in tool dislodging direction unless or until a support is in place to receive the tool as it is disengaged. As shown in the co-pending application, the interlock comprises a switch which normally interrupts the power circuit to the draw bar motor, and closes the circuit when the tool support is in place.

Having described our invention, we claim:

1. A machine tool including an elongated spindle having a bore therethrough communicating with a tool holder socket at one end adapted to receive a tool holder having a shank fitting said socket for frictional engagement therein, said shank having a threaded portion facing said bore, said spindle bore having axially spaced abutments including a first abutment spaced from said socket and facing away therefrom and a second abutment further spaced from said socket and facing said first abutment, a sectional drawbar comprising a first section and at least a second section in alignment therewith, said first section being threaded at one end for threaded engagement with the threaded portion of said shank and having a first abutment spaced from the threaded portion for reaction with said first spindle abutment in drawing said shank into said socket, a reversible power drive means, to connect said drive means to said second section, said first and second sections having operable engagement at their adjacent ends, the other end of said second section having a second abutment cooperating with said second spindle abutment, said operable engagement being constructed to rotate said first section into threaded draw engagement with said shank when said section is rotated in one direction, said second section abutment being spaced from said second spindle abutment during said rotation and said operable engagement being constructed to force said sections apart upon reverse rotation of said second section with respect to said first section until said second section abutment is adjacent said second spindle abutment and then to stop said relative rotation to transmit the rotation to said first section to break a tight threaded engagement of said first section and said shank, whereupon an unthreading action takes place causing the said second abutments to engage and apply axial thrust through said sections, thereby to dislodge a stuck shank from the socket.

2. A machine tool including an elongated spindle having a bore therethrough communicating with a tool holder socket at one end adapted to receive a tool holder having a shank fitting said socket for frictional engagement therein, said shank having a threaded portion facing said bore, said spindle bore having axially spaced abutments including a first abutment spaced from said socket and facing away therefrom and a second abutment further spaced from said socket and facing said first abutment, a sectional drawbar comprising a first section and at least a second section in alignment therewith, said first section being threaded at one end for threaded engagement with said threaded portion of the shank and having a first abutment spaced from the threaded portion for reaction with said first spindle abutment in drawing said shank into said socket, a reversible power drive means, to connect said drive means to said second section, said first and second sections having operable engagement at their adjacent ends, the other end of said second section having a second abutment, cooperating with said second spindle abutment, said operable engagement being constructed to rotate said first section into threaded draw engagement with said socket when said second section is rotated in one direction, said second section abutment being spaced from said second spindle abutment during said rotation, said operable engagement comprising cam surfaces on the adjacent ends of said sections to move said sections apart upon reverse rotation of said second section relative to said first section until said second abutments are adjacent, shoulders on said adjacent ends to stop relative rotation of said sections when said second abutments become adjacent and to transmit said rotation to said first section to break a tight threaded engagement with said shank, whereupon the unthreading of said first section with respect to a stuck shank and socket will impart thrust through said second abutments and shoulders on said adjacent section ends to rigidly transmit said thrust back to said stuck shank to dislodge the same.

3. A machine tool including an elongated spindle having a bore therethrough communicating with a tool holder socket at one end adapted to receive a tool holder having a shank fitting said socket for frictional engagement therein, said shank having a threaded portion facing said bore, said spindle bore having axially spaced abutments including a first abutment spaced from said socket and facing away therefrom and a second abutment further spaced from said socket and facing said first abutment, a sectional draw bar comprising a first section and at least a second section in alignment therewith, said first section being threaded at one end for threaded engagement with said threaded portion of the shank and having a first abutment spaced therefrom for reaction with said first spindle abutment in drawing said shank into said socket, a reversible power drive means, means to connect said drive means to said second section, said first and second sections having operable engagement at their adjacent ends, the other end of said second section having a second abutment cooperating with said second spindle abutment, said operable engagement being constructed to rotate said first section into threaded draw engagement with said shank when said section is rotated in one direction, said second section abutment being spaced from said second spindle abutment during said rotation, said operable engagement comprising cam surfaces on the adjacent ends of said sections to move said sections apart upon reverse rotation of said second section relative to said first section until said second abutments are adjacent, shoulders on said adjacent ends to stop relative rotation of said sections when said second abutments become adjacent and to transmit said rotation to said first section to break a tight threaded engagement with said shank, whereupon the unthreading of said first section with respect to a stuck shank and socket will engage said second abutments and develop a thrust force, and transverse shoulders on said adjacent section ends to rigidly transmit said thrust force back to said stuck shank to dislodge the same.

4. In a machine tool, the combination comprising a spindle having a tapered socket for frictionally engaging the shank of a cutting tool, a sectional draw bar assembly disposed for rotation and axial movement within said spindle, and having a threaded endwise portion adapted to threadedly engage the shank of the cutting tool, power means for rotating said assembly in threading or unthreading directions to effect engagement and disengagement of said threaded portion relative to the shank of the tool, said spindle presenting spaced abutments, said draw bar assembly having spaced abutments respectively cooperable with said spindle abutments, the dimensional spacing of the respective abutments normally allowing limited axial movement of said assembly in said spindle, and spreader means interconnecting the adjoining ends of said sections, said spreader means adapted to provide a constant rotary driving connection between the sections during rotation thereof in threading or unthreading directions, said spreader means adapted to thread said endwise portion into draw engagement with said spindle socket when the draw bar assembly is rotated in said threading direction, said spreader means being constructed to force said sections apart upon rotation thereof in said unthreading direction until said respective abutments of the spindle and draw bar assembly are brought into engagement, thereupon to unscrew said threaded portion from the shank and to devolp a thrust force acting through said draw bar assembly in a direction to dislodge a stuck shank from the spindle socket.

5. In a machine tool, the combination comprising a spindle having a tapered socket for frictionally engaging the shank of a cutting tool, a draw bar assembly comprising first and second sections disposed in alignment for rotation and axial movement within said spindle, said first section having a threaded endwise portion adapted to threadedly engage the shank of the cutting tool, power means for rotating said assembly in threading or unthreading directions to effect engagement and disengagement of said threaded portion relative to the shank of the tool, said spindle presenting spaced abutments, said draw bar assembly having spaced abutments respectively cooperable with said spindle abutments, the dimensional spacing of the respective abutments normally allowing limited axial movement of said assembly in said spindle, and cam means at the adjacent ends of said sections, said cam means interconnecting the adjoining ends of said sections and adapted to thread said endwise portion into draw engagement with said spindle socket when the draw bar assembly is rotated in said threading direction, said cam means being constructed to force said sections apart upon rotation thereof in said unthreading direction until said respective abutments of the spindle and draw bar assembly are brought into engagement, thereupon to unscrew said threaded portion from the shank and to develop a thrust force acting through said draw bar assembly in a direction to dislodge a stuck shank from the spindle socket.

6. In a machine tool, the combination comprising a spindle having a socket for frictionally engaging the shank of a cutting tool, said shank having a threaded portion facing said socket, a draw bar assembly disposed for rotation and axial movement within said spindle, said spindle having axially spaced abutment surfaces, said assembly comprising a pair of sections presenting abutment surfaces respectively cooperable with the abutment surfaces of said spindle, one of said sections having a portion adapted to threadedly engage the threaded portion of said tool, reversibly operable power means for driving the other of said sections, the said assembly being normally axially movable between said spindle abutments, and a reversible operable drive clutch interconnecting said sections in axial load-sustaining relation, said clutch comprising at least one inclined surface and follower cooperable therewith in consequence of operation of said power means to cause axial shifting of one section of the assembly with respect to the other, said inclined surface and follower changing the spacing of the abutment surfaces of the assembly and thereby delimiting axial movement of said assembly during rotation of the assembly in tool dislodging direction to a range which is less than the range of axial movement of the assembly during rotation of the assembly in tool engaging direction, said clutch and abutment surfaces providing a thrust force acting through said sections to dislodge a sticking shank during rotation of the sections in the tool dislodging direction.

7. A machine tool including an elongated spindle having a socket for frictionally engaging the shank of a cutting tool having a threaded portion, said spindle having an axial bore therein providing opposed thrust surfaces, a draw bar assembly mounted for axial and rotary motion in said spindle bore, said assembly comprising a pair of extensible sections disposed in endwise relationship, one of said sections comprising a driver and the other constituting a tool-engaging section, said sections having inclined throw surfaces at adjoining ends thereof, said sections normally residing in a contracted position with said throw surfaces inter-engaged and with the throw surfaces of the sections and spindle bore in spaced relationship to provide axial movement of the draw bar assembly in the spindle bore, a second bore extending from said axial bore to said tool socket, a draw rod extending from said tool-engaging section through said second bore to said socket and having screw threads formed on the end which projects into said socket, reversible driving means for rotating said driver section in screw-in or screw-out directions, said throw surfaces providing screw-in abutments for rotating the tool-engaging portion and draw rod in screw-in direction, thereby to engage and draw a tool shank forcibly into the spindle socket, and screw-out dogs at the outer end of said inclined throw surfaces, said throw surfaces and screw-out dogs camming said sections apart then providing a driving connection between the sections upon rotation of the driver section in screw-out direction, whereby said thrust surfaces engage and apply thrust to the shank of the tool to dislodge the same upon rotation of the draw rod in screw-out direction.

8. In a machine tool which includes a spindle, a long tapered socket at the end of the spindle, a cutting tool having a tapered end adapted to fit into said long tapered socket sufficiently closely to become frictionally affixed therein, a draw bar having one end thereof in threaded engagement with the tapered end of the cutting tool, and means for rotating the draw bar in either direction to establish connection or dis-connection of the cutting tool with respect to the tapered socket, the improvement which consists in the combination of two draw bar sections disposed within the spindle, each draw bar section having a shoulder thereon, said spindle having two internal abutments, one spaced from the shoulder of each draw bar section to permit limited axial reciprocation of the draw bar sections within the spindle, said draw bar sections being interconnected at their adjacent ends to provide unitary rotary motion of both draw bar sections, said adjacent ends being configurated to provide a camming engagement in one direction of rotation but not in the other, whereby the composite draw bar is of minimum length when rotating in a direction to engage the tool in the socket and of maximum length when rotating in a direction to disengage the tool from the socket, the spacing of the draw bar shoulders and spacing of the spindle abutments being such that the draw bar exerts a substantially immediate outward axial thrust on the tool when rotated in the direction to disengage the tool.

9. In a machine tool which includes a spindle having a long tapered socket at one end thereof, a cutting tool having a tapered end adapted to fit into said long tapered socket sufficiently closely to become frictionally affixed therein, a draw bar having one end thereof in threaded engagement with the tapered end of the cutting tool, and means for rotating the draw bar in either direction to engage or disengage the tapered end of the cutting tool relative to the tapered socket, the improvement which consists in the combination of two draw bar sections disposed within the spindle, each draw bar section having a shoulder thereon, spring means interconnecting the two draw bar sections and biasing the same axially toward one another, said spindle having two internal abutments spaced from the shoulders of the draw bar sections, to permit limited axial reciprocation of the draw bar sections within the spindle, said draw bar sections being interconnected at their adjacent ends to provide a driving connection between both draw bar sections in either direction of rotation, said adjacent ends being configured to provide a camming engagement in one direction of rotation but not in the other, whereby the composite draw bar is of minimum length when rotating in a direction to engage the tool in the socket and of maximum length when rotating in a direction to disengage the tool from the socket, said configurated adjacent ends of the draw bar sections adapted to provide a constant rotary driving connection between said sections in the maximum or minimum length of the composite draw bar, the spacing of the draw bar shoulders and spacing of the spindle abutments being such that the draw bar exerts a substantially immediate outward axial thrust on the tool when rotated in the direction to disengage the tool.

References Cited in the file of this patent

UNITED STATES PATENTS 2,667,820    De Vlieg _____ Feb. 2, 1954

UNITED STATES PATENT OFFICE
CERTIFICATE OF CORRECTION

Patent No. 2,994,250            August 1, 1961

John M. Walter et al.

It is hereby certified that error appears in the above numbered patent requiring correction and that the said Letters Patent should read as corrected below.

Column 9, line 44, after "drive means," insert -- means --; column 10, line 5, after "power drive means," insert -- means --; column 11, line 18, for "devolp" read -- develop --.

Signed and sealed this 23rd day of January 1962.

(SEAL)
Attest:

ERNEST W. SWIDER
Attesting Officer

DAVID L. LADD
Commissioner of Patents